United States Patent
Tamir et al.

(10) Patent No.: US 9,871,816 B2
(45) Date of Patent: Jan. 16, 2018

(54) SYSTEMS AND METHODS FOR SECURITY MANAGEMENT OF MULTI-CLIENT BASED DISTRIBUTED STORAGE

(71) Applicant: Y.G. NooBaa Ltd., Jerusalem (IL)

(72) Inventors: Eran Tamir, Rishon-LeZion (IL); Guy Margalit, Tel-Aviv (IL); Yuval Dimnik, Mishmar David (IL)

(73) Assignee: Y.G. NooBaa Ltd., Jerusalem (IL)

( * ) Notice: Subject to any disclaimer, the term of this patent is extended or adjusted under 35 U.S.C. 154(b) by 0 days.

(21) Appl. No.: 15/318,676

(22) PCT Filed: Apr. 21, 2016

(86) PCT No.: PCT/IL2016/050432
§ 371 (c)(1),
(2) Date: Dec. 14, 2016

(87) PCT Pub. No.: WO2016/174668
PCT Pub. Date: Nov. 3, 2016

(65) Prior Publication Data
US 2017/0155676 A1    Jun. 1, 2017

Related U.S. Application Data

(60) Provisional application No. 62/152,904, filed on Apr. 26, 2015.

(51) Int. Cl.
*H04L 29/06*    (2006.01)
(52) U.S. Cl.
CPC ...... *H04L 63/1433* (2013.01); *H04L 63/1441* (2013.01)

(58) Field of Classification Search
CPC ............. H04L 63/1433; H04L 63/1441
USPC ........................................... 726/25
See application file for complete search history.

(56) References Cited

U.S. PATENT DOCUMENTS

| | | |
|---|---|---|
| 7,869,383 B2 | 1/2011 | Tabbara et al. |
| 8,108,502 B2 | 1/2012 | Tabbara et al. |
| 8,462,665 B2 | 6/2013 | Tabbara et al. |
| 2005/0240591 A1 | 10/2005 | Marceau et al. |

(Continued)

FOREIGN PATENT DOCUMENTS

WO    WO 2016/174668    11/2016

OTHER PUBLICATIONS

International Search Report and the Written Opinion dated Aug. 7, 2016 From the International Searching Authority Re. Application No. PCT/IL2016/050432.

(Continued)

*Primary Examiner* — Hadi Armouche
*Assistant Examiner* — Angela Holmes (57) ABSTRACT

There is provided a method of maintaining a security risk level of data objects stored in a distributed system, comprising: estimating a current security risk level of at least one storage unit of each of a plurality of network nodes based on real time monitoring; distributing a plurality of data objects among the at least one storage units of the plurality of network nodes according to the current security risk level such that a minimal security requirement of each data object is complied with; detecting a change in the current security risk level of the at least one storage unit; and creating a new copy of at least one of the data objects for storage on a different network node such that the minimal security requirement of each data object is maintained.

33 Claims, 4 Drawing Sheets

(56) References Cited

U.S. PATENT DOCUMENTS

| | | |
|---|---|---|
| 2006/0230245 A1 | 10/2006 | Gounares et al. |
| 2008/0077638 A1 | 3/2008 | Monk et al. |
| 2009/0094251 A1 | 4/2009 | Gladwin et al. |
| 2011/0225451 A1 | 9/2011 | Leggette et al. |
| 2013/0227691 A1 | 8/2013 | Aziz et al. |
| 2016/0162693 A1 | 6/2016 | Breuer et al. |

OTHER PUBLICATIONS

Tian et al. "Secure Fragment Allocation in a Distributed Storage System with Heterogeneous Vulnerabilities", Sixth IEEE International Conference on Networking, Architecture, and Storage (NAS): 170-179, Jul. 31, 2011. Abstract, Section III D, Section VI.
Supplementary European Search Report dated Apr. 11, 2017 From the European Patent Office Re. Application No. 16786068.3. (5 Pages).

SYSTEMS AND METHODS FOR SECURITY MANAGEMENT OF MULTI-CLIENT BASED DISTRIBUTED STORAGE

RELATED APPLICATIONS

This application is a National Phase of PCT Patent Application No. PCT/IL2016/050432 having International filing date of Apr. 21, 2016, which claims the benefit of priority under 35 USC §119(e) of U.S. Provisional Patent Application No. 62/152,904 filed on Apr. 26, 2015. The contents of the above applications are all incorporated by reference as if fully set forth herein in their entirety.

BACKGROUND

The present invention, in some embodiments thereof, relates to distributed systems and, more specifically, but not exclusively, to systems and methods for managing security of multi-node based distributed systems.

Distributed systems include multiple connected nodes available for distributed applications, such as distributed storage of data objects and/or distributed processing.

In distributed storage systems, data objects may be split into multiple segments. Different segments are locally stored on storage units associated with different nodes.

In distributed computing systems, computational problems may be divided into many tasks, each of which may be processed by a different node.

SUMMARY

According to an aspect of some embodiments of the present invention there is provided a method of maintaining a security risk level of data objects stored in a distributed system, comprising: estimating a current security risk level of at least one storage unit of each of a plurality of network nodes based on real time monitoring; distributing a plurality of data objects among the at least one storage units of the plurality of network nodes according to the current security risk level such that a minimal security requirement of each data object is complied with; detecting a change in the current security risk level of the at least one storage unit; and creating a new copy of at least one of the data objects for storage on a different network node such that the minimal security requirement of each data object is maintained.

Optionally, creating a new copy of at least one of the data objects comprises reconstructing the new copy from redundancy data.

Optionally, creating a new copy comprises creating the new copy of at least one data segment of the data object, wherein a plurality of data segments stored on different network nodes are used to reconstruct the data object.

Optionally, creating a new copy comprises creating the new copy of a set of data segments sufficient to reconstruct the data object, wherein each member of the set is stored on a different network node.

Optionally, detecting is performed in real-time.

Optionally, detecting is performed at time periods independent from at least one of: data object storage operations and data object retrieval operations.

Optionally, detecting comprises receiving network messages transmitted from each network node to at least one management unit, the network messages including a member of a group consisting of: data for calculating a real-time security score, a calculated new security score, and the change in the security score.

Optionally, the security risk level is a security score calculated from at least one of: a current security risk score and a data integrity score.

Optionally, the security risk level is a security score calculated from at least one security parameter selected from the group consisting of: a risk of access by an unauthorized entity to stored objects, risk of compromising integrity of the stored objects, risk of compromising allowed access, and risk of infection by malware.

Optionally, the security risk level represents a real-time probability of occurrence of an event defined by the at least one security parameter.

Optionally, the security risk level is a security score calculated based on instructions issued by a remote unit to the network node to perform a security test locally that attempts to breach security of the respective storage units, and gathers the outcome of the test.

Optionally, the method further comprises adding metadata to each data object or part thereof, wherein the change in the security risk level is identified according to calculated changes in an integrity test performed on each data object using the added metadata. Optionally, the metadata includes at least one member of a group consisting of: random bytes and locations within the data object, algebraic signatures, checksum values and hash values.

Optionally, redistributing data objects comprises reconstructing at least one data object stored on the storage unit using data stored on other storage units, and storing the at least one reconstructed data object on a different storage unit.

Optionally, the security risk level is a security score calculated from at least one security parameter member selected from the group consisting of: history of detected security vulnerabilities, anti-malware software version installed on the network node, presence of a firewall, and physical location of the network node.

Optionally, the method further comprises estimating the security risk level for the new network node; and adding the new network node to the distributed system when a minimal predefined system risk requirement is maintained by the new network node.

Optionally, the method further comprises processing the network node to increase the security risk level of the network node to the minimal predefined system requirement.

Optionally, the method further comprises receiving a new data object for storage within the distributed system, the data object associated with a security requirement representing a desired minimum security risk; dividing the new data object into a plurality of data segments; designating each data segment for storage within a different storage unit such that the desired minimal security requirement of each data segment is maintained.

Optionally, the method further comprises identifying a storage unit having the change in the current security above a predefined system risk requirement; and redistributing all data objects stored on the identified storage unit, to storage on different storage units such that the minimal security requirement of each data object is maintained relative to the predefined system risk requirement. Optionally, the method further comprises removing the identified storage unit from the distributed system.

Optionally, the method further comprises encrypting the data object to meet the minimum security requirement and maintaining other data objects in a non-encrypted state according to the minimum security requirement.

Optionally, the method further comprises providing a decryption key for decryption of encrypted data objects after confirmation of the minimum security requirement.

Optionally, the method further comprises increasing the security risk level of the storage unit by encrypting data objects stored thereon.

Optionally, data objects are at least one of: initially stored and redistributed to storage on different network nodes according to a predefined security profile.

Optionally, the predefined security profile includes at least one member selected from the group consisting of: designated contacts of a user providing the data object, a designated organization associated with the user, and a network service provider.

Optionally, the method further comprises analyzing changes in the security risk level to predict a future security risk level, and performing the creating the new copy before the minimal security risk level is reached.

Optionally, the method further comprises analyzing changes in the security risk level indicative of a risk event in the storage unit, quarantining the storage unit, reconstructing data objects stored on the storage unit from redundant data stored on other storage units, and redistributing the reconstructed data objects.

According to an aspect of some embodiments of the present invention there is provided a system of storing data objects in distributed storage while maintaining a security requirement, comprising: a plurality of network nodes, each including at least one processor and at least one storage unit; wherein each storage unit is associated with a current security risk level estimated based on real time monitoring; wherein a plurality of data objects are distributed among the at least one storage units of the plurality of network nodes according to the current security risk level such that a minimal security requirement of each data object is complied with; and at least one management unit in communication with the plurality of network nodes, the at least one management unit including a code implementable by a processor of the at least one management unit to: detect a change in the current security of at least one of the plurality of network nodes and creating a new copy of at least one of the data objects for storage on a different network node such that the minimal security requirement of each data object is maintained.

Optionally, the data objects are members selected from the group consisting of: images, documents, databases, videos, operating system files, and medical records.

Optionally, the data objects include code designed for distributed processing by local execution by the at least one processor of the respective node.

Optionally, the system further comprises an agent module for local installation at each network node, the agent module including a code implementable by a processor of the agent module to locally gather data to estimate the security risk level of the respective at least one storage unit, and transmit the gathered data to the management unit.

Optionally, the system further comprises a client module in communication with the management unit, the client module including a code implementable by a processor of the client module to store a data object within the distributed system and retrieve the stored data object from the distributed system. Optionally, the client module is an application programming interface (API) that provides a high abstraction level of storing and accessing data objects locally at respective network nodes or client computers.

According to an aspect of some embodiments of the present invention there is provided a computer program product for maintaining a security requirement of data objects stored in a distributed system comprising a readable storage medium storing program code thereon for use by a management unit, the program code comprising: instructions for estimating a current security risk level of at least one storage unit of each of a plurality of network nodes based on real time monitoring; instructions for distributing a plurality of data objects among the at least one storage units of the plurality of network nodes according to the current security risk level such that a minimal security requirement of each data object is complied with; instructions for detecting a change in the current security risk level of the at least one storage unit; and instructions for creating a new copy of at least one of the data objects for storage on a different network node such that the minimal security requirement of each data object is maintained.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to distributed systems and, more specifically, but not exclusively, to systems and methods for managing security of multi-node based distributed systems.

An aspect of some embodiments of the present invention relates to one or more management units and/or peer network nodes for maintaining a desired security requirement for data objects stored within a distributed system. The distributed system includes at least one network node, each including one or more processors (which may provide computational services), and optionally one or more storage units (which may provide storage services). The management unit(s) may be implemented as one or more central servers and/or implemented by one or more of the nodes. The security risk level of each network node and/or related storage unit of the node is monitored in real time, optionally by the management unit(s). New copies of one or more data objects and/or data segments are created in different nodes to maintain the desired security requirement when a change in the security risk level of the node storing the data object(s) and/or data segment is detected.

Optionally, as a security measure, each data object is stored as divided segments distributed across different nodes. Optionally, some segments of the data object are copied and some segments are maintained, for example, when related network nodes storing the segments have been detected to have a security compromise while other network nodes have not been detected to have had a security compromise.

Alternatively, the set of data segments of the data object (i.e., the data segments which allow reconstruction of the data object) may be copied, for example, when the data object has been determined to be compromised. Alternatively, the whole data object may be stored on a single node, optionally in segments.

Optionally, the new copy process is initiated by the one or more management units and/or peer node, by reconstructing the data segment from redundancy data stored on other nodes, for example, recovered using erasure codes and/or copied from a mirror copy. Existing data segments on the node having the security risk level change, which may be contaminated and/or corrupted, are not used to create the new copy. In this manner, the new created copy is validated as being non-contaminated and/or non-corrupted.

Optionally, each stored data object is associated with a security requirement representing a minimal security risk level. The security requirement of the data object may be inherited by the data segments. The security requirement may be stored as data in a volatile memory and/or storage associated with the management unit and/or one or more network nodes. Alternatively or additionally, the system is associated with a security requirement. Alternatively or additionally, one or more predefined buckets (e.g., manually defined by an operator and/or automatically by code) are associated with the security requirement, for example, sets of nodes. The security requirement and/or security risk level may be one or more thresholds, one or more ranges, one or more functions, one or more scores, one or more parameters, and/or combinations thereof, for example, a threshold calculated from several parameters. The minimal security requirement represents acceptable security risk levels of client network nodes and/or storage units associated with the network node for storing the data object. Each storage unit may store different segments of different data objects, each having a security requirement that defines the security risk level of the network node and/or data object as acceptable security.

Optionally, respective security risk levels are independently re-estimated for each network node in real-time, based on parameters which are continuously or iteratively sampled by local or central monitoring entity, such as a module installed on each network node and/or the management unit receiving messages from and/or sending messages to the network nodes. Changes in the security risk level of the storage unit and/or network node detected by the module or the central server trigger creation of one or more new copies of data segments and/or data objects stored on the storage unit. The newly created segments are stored on different storage units of different network nodes. Data segments for which the new current storage level represents unacceptable security risk level are created and saved on other storage units having acceptable security risk level (i.e., units with relatively lower security risk levels). Optionally, a copy of a subset of segments stored on the network node is created on other node(s). The other segments may remain on the existing node, such as segments related to other objects with a minimal requirement of security risk level, which is higher than the new updated level. The subset of segments on the original node may be marked and/or tagged as compromised, and optionally deleted, or marked for additional investigation (e.g., a malware scan). Alternatively, the relevant segments stored on the network node are created on other nodes, which may leave no data segments remaining on the existing nodes. The network node may be marked and/or tagged as compromised, which may lead to additional investigations. Alternatively or additionally, when one or more data segments are identified as being associated with unacceptable security risk level (which may suggest the data segments have been compromised), one or more of the other data segments stored on the same network node, which are associated with an acceptable security risk level (which may suggest the data segments have not been compromised) may be redistributed to other network nodes (e.g., copied from the original node to the new node), for example, as an additional preventive security measure.

Optionally, the management unit and/or peer node analyzes the changes in the security risk level of each storage unit and/or node, to predict future security risk levels. For example, gradual reduction in security risk level may represent a security neglect of the network node, for example, due to lack of updated malware, and/or downloading of unsafe programs. Copies of data segments stored on storage unit(s) may be created before the security risk level of these storage unit(s) reaches an unacceptable level.

Alternatively or additionally, copies of data objects and/or data segments may be created and stored on storage units and/or nodes having acceptable security levels. In this manner, the data objects may be continuously maintained within a storage unit and/or node having a safe security risk level, without having to wait until the security risk level reaches unacceptable levels, leaving a time period between the monitoring and creation of the new copy in which the data object is in an unsafe state.

Optionally, potential new network nodes to the distributed system are evaluated by the management unit and/or peer node for an acceptable security risk level. The security risk level of the new network node may be calculated and compared to an acceptable system risk requirement. Network nodes having acceptable security risk levels may be added to the distributed system. Network nodes having unacceptable security risk levels may undergo additional processing to increase their security risk level to the acceptable system risk level. For example, the network node may be allocated for certain usages, such as storing segments of a divided data object. The segment may be stored in an unsafe environment when, for example, the segment alone represents meaningless data and/or performs simple calculations.

Optionally, the monitored security risk levels of existing network nodes and/or storage units are compared against the system risk requirement by the management unit and/or peer node. Nodes and/or storage units that had increases in security risk level, and now have unacceptable risk levels according to the security requirement are removed from the distributed system. The data segments stored on the removed nodes are newly created on other storage units from redundancy data, without using the original data (which may be compromised, infected and/or corrupted), such that each redistributed object is stored on a storage unit having an acceptable security risk level risk level according to the security requirement associated with the object.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, an allocated logical storage unit (e.g., by a remote storage area network (SAN) assigning a logical unit number (LUN)) and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term distributed system means multiple connected nodes available for distributed applications. The nodes may include one or more of: nodes for storage of data objects, nodes for distributed processing, and nodes performing central management unit functions. The node may include code to perform one or more of the functionalities of: storage of data objects, processing, and management, as described herein.

As used herein, the term management unit sometimes broadly includes different possible implementations of the management unit described herein, for example, one or more servers (e.g., central server) separate from the peer nodes, one or more peer nodes dedicated to perform management unit functions, and/or one or more peer nodes that perform management unit functions in addition to distributed storage and/or distributed computing functions. The management unit may provide local and/or central management functions. The term management unit may include a single management unit (e.g., in a central server implementation), and/or multiple units (e.g., in a distributed node implementation).

As used herein, the term storage unit means a device able to store digital data, and allows access (e.g., to read and/or write) to the stored data through a physical and/or logical interface using a language and/or protocol. Network nodes may include one or more storage units.

As used herein, the term network node means a network connected device. Tasks may be delegated to the network node from other devices, such as controlled by the management unit(s). The network node may be, for example, a physical device (e.g., computer), a virtual device (e.g., virtual machine), a card within another device, and/or a service offering.

As used herein, the term data object sometimes encompasses both a whole data object, or a segment of a divided data object. The data objects may include data blocks, which are sequences of bytes and/or bits, which may contain whole numbers of objects, which may have a maximum length (block size). The data blocks may be distributed as a whole, or in segments.

As used herein, the term network node is sometimes interchangeable with the term storage unit, for example, when referring to estimation of the security risk level. The security risk level may be estimated for the network node itself (e.g., as a gateway to attached storage units), when a set or all storage units are considered together, or for the entire network node. It is noted that when one or more storage units of the network node have changes in security risk level, the security risk level of the entire network node may be affected, for example, when security of one storage unit is breaches, security of the other storage units on the same node are at high risk of security breach.

Figure 1:
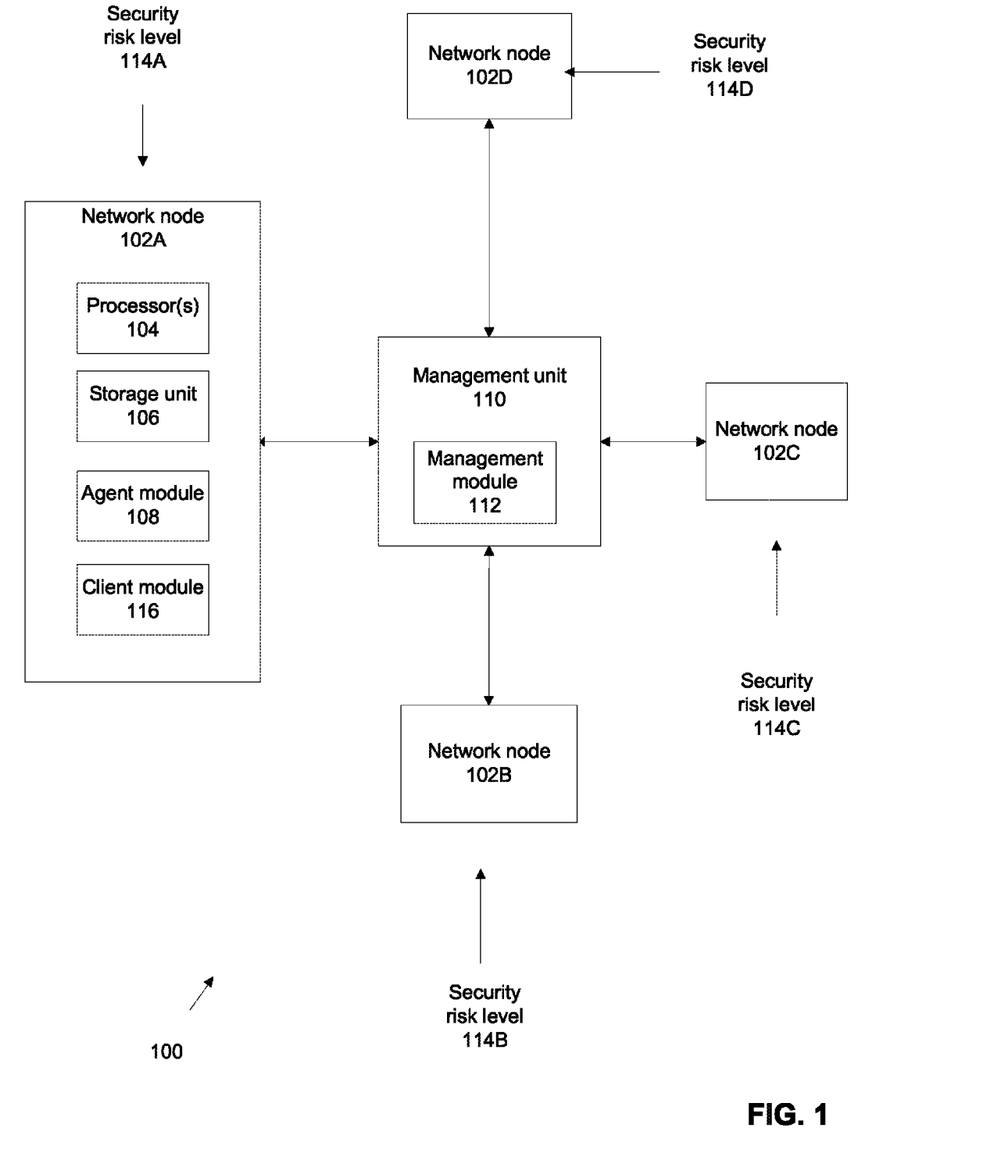
FIG. 1 is a block diagram of components of a distributed system that monitors security of network nodes and creates a new copy of stored data objects and/or segment(s) in a different node, in accordance with some embodiments of the present invention.

Reference is now made to FIG. 1, which is a block diagram of components of a distributed system 100 that detects changes in security risk levels of one or more network nodes 102A-D and creates new copies of stored data segments on a different node, to maintain a desired security requirement, in accordance with some embodiments of the present invention. Detection of the changes in security risk level allows system 100 to maintain predefined security risk level requirements for each data segment stored therein, by generating new copies of stored segments when necessary, as described herein. Optionally, the new copies are created by reconstructing the data segment from redundancy data stored on other nodes.

Distributed system 100 may be a distributed storage system (i.e., which stores data objects as segments in different nodes) and/or a distributed computing system (i.e., which executes different portions of code at different nodes).

The systems and/or methods described herein allow for a wide variety of network nodes, which may have varying degrees of security risk levels (e.g., ranging from very secure to insecure), to be used within the same distributed system. Network nodes having relatively high security risk level may store data objects for which security risk level is irrelevant or may tolerate such high risk of security breaches, for example, storing additional encrypted redundancy data to provide improved performance. Security breach of the additional redundancy data in such a case would not significantly affect overall performance. In another example, system data used to perform security challenges may be stored on such nodes, as the security challenge data is already used to simulate security breaches.

The systems and/or method described herein may improve performance efficiency of existing distributed systems, such as distributed storage systems and/or distributed processing systems (e.g., computing cloud based system, data warehouses, client based distributed storage) by improving the efficiency of available memory (e.g., matching acceptable security risk levels of memory to desired security risk levels of data objects), and/or by reducing damage due to security breaches.

Each network node 102A-D includes one or more processors 104, for example central processing unit(s) (CPU), graphical processing unit(s) (GPU), field programmable gate array(s) (FPGA), which may be arranged in single units, as a set of similar processors, and/or as a set of dissimilar processors. Processor 104 may be used, for example, to provide communication functions between the respective node and other devices, and/or to perform delegated tasks, such as computing hashes and/or rebuilding data objects in local memory. Each node 102A-D optionally includes one or more storage units 106, for example, a hard drive, a flash card, an optical drive, a redundant array of independent disks (RAID) and/or other memory modules. Portions of storage unit 106 may be designated and/or dynamically allocated as shared storage, which becomes accessible to the distributed storage system for storage of data objects provided by other users.

Nodes 102A-D may be similar in architecture, or different, for example different types of computers connected together. Network nodes 102A-D may include, for example, clients, servers, computers, a desktop computer, a laptop computer, a mobile device, a Smartphone, a tablet computer, or a network server.

Each network node of a set of network nodes optionally stores a segment of a divided data object on its respective local memory. For example, one data object may be split into two segments stored on network nodes 102A and 102B, and another data object may be split into three segments stored on network nodes 102B-D. Examples of data objects include: images, documents, databases, videos, operating system files, and medical records. Alternatively or additionally, the data objects may include code designed and/or scheduled for distributed processing by local execution by the local processor. It is noted that segments may be stored on different storage units of the same node.

System 100 represents an example architecture, in which one or more management units 110 (e.g., central server) communicate with each (or a subset of) network nodes 102A-D (which may be considered as network nodes) over a network connection via network interfaces at the server and each network node, for example, a local area network, the internet, a cellular network connection, and/or a dedicated connection. It is noted that for clarity of illustration, a single central management unit 110 is depicted, however as described herein, it is understood that system 100 may include multiple central management units 110, for example, arranged as a cluster, such when system 100 includes nodes that are widely geographically separated and/or a very large number of nodes.

A management module 112 which may be stored on each management unit 110, may be programmed to perform monitoring of the network nodes, creation of new copies, and/or other functions as described herein. Examples of other architectures include: no central processor with management module 112 stored on one of the network nodes, multiple management modules 112 stored on multiple network nodes (allowing for multiple control points), and/or a system without central management (i.e., a connection initiated between two nodes is managed by management metadata distributed for storage on different nodes. Such a system is designed to grow without specific dependencies between management nodes and network nodes).

Optionally, each network node 102A-D has stored thereon an agent module 108 for communicating with one or more central processors 110, as described herein.

Optionally, each network node 102A-D is associated with a real-time updated security risk level 114A-D representing a real-time security risk level of data stored thereon, calculated as described herein. Security risk level 114A-D may be stored on a memory in communication with each node and/or with management unit 110. System 100 may store data object segments, each of which may be associated with a security requirement representing a desired security risk level, according to the real-time security risk level of each network node. Copies of segments of data objects are created (e.g., reconstructed from redundancy data) in response to local changes in security risk levels of network nodes, as described herein.

Optionally, a client module 116 and/or client application includes code implementable by processor(s) of the network node for allowing a user to store a data object within the distributed storage system, and/or retrieve the stored data object from the distributed storage system, in an optional abstract (e.g., seamless) manner. Client module 116 may act as a gateway, which may be used by other applications (e.g., third party code) to access the distributed system for distributed storage and/or distributed computation. Client module 116 may be implemented within the network node (as shown), and/or be implemented on a separate device (not shown). Client module 116 provides a high abstraction level of storing and accessing data objects, to each user, locally at respective network nodes. For example, client module 116 is locally installed on a client (which may or may not be a network node) acting as a drop-box, allowing the user to store data on the distributed system from the client. The user may right-click on a certain data object, and selects an option to store the data object within the distributed storage system. Explicit data upload and/or download instruction by the user to the central server may not necessarily be required. In another example, client 116 accesses an application programming interface (API) related to the data objects. In another example, client module 116 may be an archiving system that automatically backs-up data on the client to the distributed system without necessarily requiring explicitly user input, for example, based on defined periods of time and/or events (e.g., changes to files and/or new files). Client module 116 may be installed on each network node, making the functionality accessible to each user of each respective network node.

Alternatively or additionally, client module 116 may be installed on the management unit, remotely accessed by the user, for example, via a web browser. Client module 116 may be implemented as a graphical user interface for user by a local user and/or system administrator.

Client module 116 may be implemented, for example, by an application programming interface (API), such as representational state transfer (REST) API and/or a software development kit (SDK). The API and/or SDK may run locally on a client of the distributed system, which may be a network node or a computer not acting as a network node. The API and/or SDK be integrated within existing application (for example, web browsers, operating systems, search applications, image viewers, and word processors), such as to provide the option of saving the current data object to the distributed storage system.

Optionally, an interface, for example, a graphical user interface, in communication with one or more management unit includes code implementable by a processor of the management unit that allows a user (e.g., system administrator) to view and/or perform system-level functions, for example: displaying the current available storage locations suitable for storing a new data object (e.g., according to security risk level), displaying storage locations of segments of a stored data object, real-time security risk level of each affiliated, and performance parameters of each network node. The displayed data may assist the user in selecting the security requirement for new or existing data objects.

Figure 2:
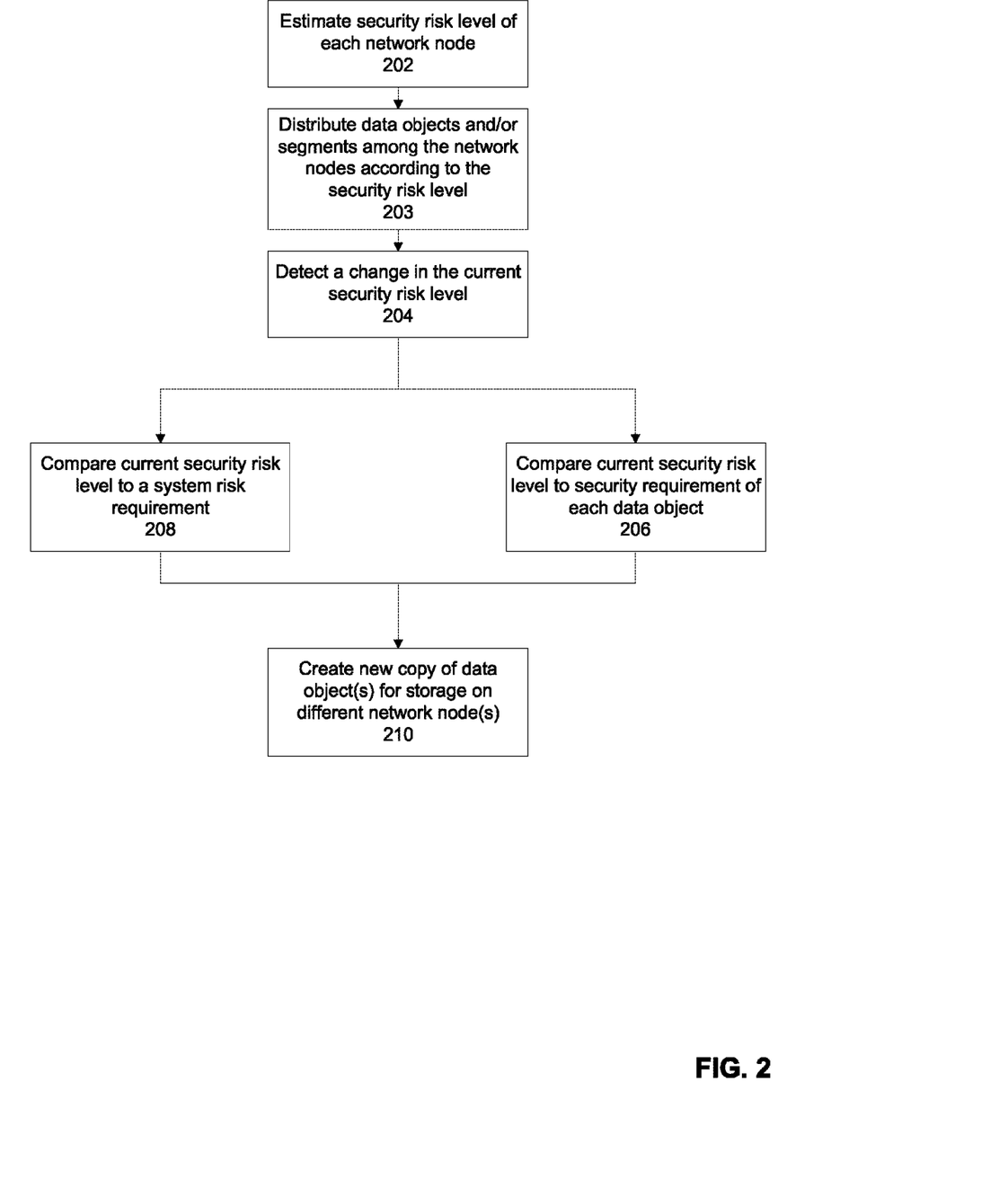
FIG. 2 is a flowchart of a method for maintaining a security risk level within a distributed system, in accordance with some embodiments of the present invention.

Reference is now made to FIG. 2, which is a flowchart of a method for maintain a desired security risk level within a distributed system, in accordance with some embodiments of the present invention. The method monitors security risk levels at each network node member of the distributed system. When changes in security risk level(s) are identified at certain network nodes, affected data objects are copied (e.g., reconstructed) to new node(s) to restore the desired security risk level. The method of FIG. 2 may be performed by system 100 of FIG. 1.

At 202, a security risk level representing a security risk of stored data objects is estimated and/or calculated for each respective network node of a distributed system. The security risk level may be a score. The security risk level may represent a real-time probability of occurrence of an event defined by the one or more security parameters, such as a security breach. The security risk level may represent security risk due to human hackers, human thieves, and/or malicious software (e.g., viruses).

The security risk level may be, for example, a continuous variable (e.g., a probability value between 0 and 1), or a discrete value (e.g., a grade between A and F). The security risk level may be calculated from one or more security parameters representing different network security risk aspects (e.g., different types of security breaches), for example, risk of access to stored objects by an unauthorized entity, risk of compromising integrity of the stored objects, risk of compromising allowed access, and risk of infection by malware. Alternatively or additionally, the security risk level may be calculated from multiple security parameters representing risk factors correlated with security breaches, which may be locally collected by the client module, for example, history of previous security breaches, anti-malware software version installed on the network node, number of users using the computer, password protection enabled for the users, internet connectivity (protected or not), internet browser program and/or version, operating system program and/or version, last performed malware scan performed on the storage unit, presence of a firewall, and physical location of network node. The security risk level may be calculated according to one or more integrity tests (as described herein) performed over time, for example, average attempts to read and/or write from invalid locations and/or invalid blocks.

Optionally, the security risk level is a security score calculated from a current security risk score and/or a data integrity score. The security score may be calculated based on one or more security related parameters, for example, installed anti-virus software, and password protection, as described herein. The data integrity score may be calculated, for example, by issuing integrity tests as described herein, calculating a predefined hash value, and/or comparing the stored data to a mirrored copy to detect differences. Two extreme cases are now illustrated. In a first case, the security risk score is low (e.g., no password protection and no anti-virus software) and the data integrity score is high (e.g., data integrity has not been affected for a long period of time), which may result in a high security risk level (i.e., low security risk). In a second case, the security risk score is high (e.g., password protection enable, and anti-virus installed), and the data integrity score is low (e.g., data integrity has been affected 20 times over the past 24 hours), which may result in a low security risk level (i.e., high security risk).

The level may be calculated according to a formula, which may assign weights to sub-scores of the security parameters. Alternatively or additionally, the level may be estimated using a look-up table or statistical classifier, that map one or more security parameters to a certain level. The security risk level may be a function based on one or more of the parameters.

The security risk level may be calculated based on a security challenge issued to each network node. The security challenge may be a security test that is locally performed at the network node based on instructions provided by one or more of the management units. The test may attempt to breach security of the respective storage unit. Data indicative of the outcome is gathered and analyzed, locally and/or at the central server. The security challenge may include an attempt to breach security of the respective network node, for example to try to: retrieve one or more stored segments of data objects, corrupt one or more stored segments, block access to one or more stored segments, and/or delete one or more stored segments. The level may be calculated based on the success or failure of the challenge. Security challenges may be performed at regular intervals, periodically, as part of monitoring, and/or triggered by security related events.

Optionally, changes in the security risk level over time are analyzed by the management unit and/or by the client module. Optionally, downward trends in the security risk level are identified. The changes may be analyzed to predict a future security risk level, optionally within an expected time frame. The creation of new copies of data segments, as described herein, may be performed according to the predicted future security risk level, optionally before the expected time frame, to maintain the minimal requirements of the data objects, before the security risk level drops below the minimal requirement.

The security risk levels may be calculated centrally by code implementable by processor(s) of the management unit using data sent by each respective client module of each network node, for example, parameters from which the security risk level is estimated from. Alternatively or additionally, the security risk level may be calculated independently by code implementable by processors(s) of the client module associated with each network node. The calculated level of each network node may be transmitted to the central server.

At 203, code implementable by processor(s) of one or more network nodes and/or management units(s) distributes data objects and/or segments among the network nodes according to the security risk level of each node such that the minimal security requirement of each data object is complied with. Each network node has stored thereon data segments having security requirements that are met by the current security risk level of the network node. Additional details, such as storing of a new received data object are described, for example, with reference to block 404 of FIG. 4.

Optionally, different data objects and/or segments (of the same or different objects) are encrypted by an encryption module to different encryption levels according to the security requirements, for example, determined by complexity of the encryption, size of the key, and/or difficulty in decryption without the key. On the same node, some data objects may be encrypted within higher encryption levels to increase the security risk level to meet one security requirement, and other data objects are maintained in a relatively lower encrypted state when meeting another security requirement with both sets of data objects thereby meeting their respective security requirements. The data objects may be segments of one data object, such that some segments are encrypted with relatively higher encryption levels, while other segments are encrypted with relatively lower encryption levels.

At 204, a change in the security risk level of each network node is detected, optionally by code implementable by processor(s) of the client module and/or central server that monitors one or more parameters described herein. Security risk levels may change, indicating a relative increase or a relative decrease in security risk for the respective network node.

Optionally, detection is performed in real-time, for example, based on data measured within the last millisecond, second, minute, or hour, or triggered by recent events.

The detection may be performed at periods of time that are independent from and/or different than the time of occurrence of object storage and/or retrieval operations performed on the network node. The monitoring may be performed independently (e.g., not triggered by) other operations, such as the save and/or retrieval procedures. In this manner, operational efficiency may be improved, as the system saves new data objects using recent security risk levels (e.g., instead of discovering the state of the network node while trying to save) and/or retrieves validated data objects (e.g., instead of trying to retrieve a segment and discovering that the network node had a security breach and/or the object may be corrupted or otherwise compromised).

Detection may be performed continuously (e.g., based on a continuous stream of data), periodically during defined time intervals, occasionally using random time intervals, and/or triggered by events (e.g., security breaches, and/or changes in calculated security risk levels).

Monitoring and/or detection may be performed by transmitting network messages (e.g., encapsulated within frames and/or packets) from each network node to the management unit, where the network messages are analyzed to identify changes in the security risk levels of each network device. The network message may be automatically sent by each network node, and/or triggered in response to a request sent by the central server to the network node. The network messages may include: data for calculating the real-time security risk level, the calculated new security risk level, and/or the change in the security risk level. Network messages may include performance parameters of the network node.

The change in security risk level may be calculated based on an integrity test performed on each segment. Each segment or part thereof may contain added metadata (e.g., added during splitting of the data object for storage), for example, random bytes and locations, algebraic signatures, and/or data for calculating a checksum and/or hash. An initial security risk level may include a value calculated by applying the integrity test to the segment, which represents a baseline value. Changes relative to the baseline value calculated by applying the integrity test may represent a security breach of the data, for example, manual tampering by a user or hacker, and/or malicious software data corruption.

Monitoring and/or detection may be performed by one or more peer nodes to one or more other peer nodes (i.e., not necessarily by the monitoring unit). Optionally, monitoring and/or detection is performed by one node, for example, sending queries to the peer node requesting data, the replies of which are analyzed by the sending node for monitoring and/or detection. Alternatively or additionally, one peer node performs the integrity test on another peer node. Integrity test information and/or modules containing code to perform the monitoring and/or detection may be distributed for local storage at multiple nodes. The multiple nodes performing the integrity test, monitoring and/or detection may be selected for system scalability, performance (e.g., avoid network bottlenecks with information travelling to the management unit), and/or to avoid single point of failures which may disable the system (e.g., failure of the management unit).

Optionally, at 206, the new security risk level of each network node is compared to a security requirement associated with each data segment of each data object stored on the network node by code implementable by processor(s) of node(s) and/or management unit(s). The security requirement represents a desired security risk, which may be defined manually by the user (e.g., by a system administration, and/or via the management interface for the client module) or automatically selected by a software module (e.g., according to type of file, according to recognition of confidential data in the object, and/or according to predefined manual settings). The security requirement may be based on the same representation mechanism used for the calculated security risk level, for example, a probability value between 0 and 1. The security requirement may be a function based on multiple parameters. The security requirement may be a security profile, defining different security scenario and/or multiple requirements according to different environments. It is noted that the security requirement of stored data segments may dynamically change, for example, manually adjusted by the user and/or according to dynamic variables from which the requirement is calculated. In such cases, the new security risk level is compared to the new security requirement.

Data objects may be stored in the distributed system as multiple segments stored on a set of designated network nodes, for example, each network node stores one or more object segments. It is noted that all segments of the same data object are associated with the same security requirement.

In network nodes in which the new security risk level change represents a relatively higher security risk than the previous security risk level, a set of segments is identified for creation of new copies thereof on one or more different nodes (e.g., by reconstruction from redundancy data). The set is identified according to the requirement of each object, which represents unacceptable risk in comparison to the new calculated security risk level. For example, when the level for a certain network node changes from 0.3 to 0.5 (indicating an increase in security risk), all segments of objects with requirements of 0.5 or lower are designated for creation of new copies thereof, as the network node now has an unacceptable security risk for these objects. Existing segments of objects with requirements higher than 0.5 may remain, as the security risk for such objects remains acceptable.

Alternatively or additionally, at 208, the new security risk level of each network node is compared to a predefined system risk requirement by code implementable by processor(s) of node(s) and/or management unit(s). A set of network nodes having new security risk levels which represent unacceptable risk in view of the predefined system risk requirement are identified.

All segments stored on each member of the identified set are designated for creation of new copies and storage on other network nodes having relatively lower security risk levels representing acceptable security risk in view of the predefined system risk requirement.

Optionally, members of the set of network nodes are removed from the distributed system. Alternatively, the members of the set are quarantined and monitored as in 204 by the code, to detect when the security risk levels fall back below the predefined system risk requirement. The network nodes may be removed from quarantine by being added back to the distributed system and/or removed from the system.

The predefined system risk requirement may be manually set by a user (e.g., system administrator), automatically calculated by a software module (e.g., based on the type of data stored within the system), and/or by the application interface of the client application that uses the system.

The comparison of blocks 206 and/or 208 may be performed by code of the management module implementable by processor(s) of the management unit.

Optionally, when a security risk and/or risk event is detected in a certain network node and/or certain storage unit, measures are taken by the central server and/or client module to protect other interconnected nodes and/or storage units. The security risk and/or risk event may include, for example, malware infection, a hacker attack, tampering of data, and reduction of access to data with risk of no access. The security risk may be detected, for example, by the security risk level of the node exceeding the security requirement of the system, by the security risk level of the node exceeding all or most or a subset of requirements of locally stored data objects, and/or by a predefined increase in the security risk level of the node (e.g., jump by a certain number of points, a certain percent, or other large changes). Other node may be protected by quarantining of the risky node and/or removal of the node from the distributed system. The data segments stored on the node may be reconstructed from redundancy data stored on other nodes, and redistributed to different nodes according to security risk levels that meet respective security requirements. In this manner, possibly infected data objects are not accessed, reducing the risk of spreading malware to other nodes.

At 210, one or more new copies of identified segments (of block 206 and/or 208) from the risky network node are created and redistributed for storage to other network nodes having respective security risk levels representing lower security risk relative to the security requirement of each object (i.e., to the safe network node), by code implementable by processor(s) of node(s) and/or management unit(s). The new copies may be reconstructed from redundancy data stored on other nodes in which the security requirement has been maintained. The original copy of the data in the risky network node may be deleted and/or further investigated, for example, scanned for malware and/or corruption. The storage of the new copies of one or more of the stored data segments is performed such that the minimal security requirement of each data object is maintained.

The redistribution may be performed by the code of the management unit, which may move or copy data segments (e.g., for reconstruction) directly from one storage unit (e.g., storing redundancy data) to another storage unit. The management unit may copy data segments from the storage unit to a temporary storage (which may be on the server itself) and then to the target storage unit. The management unit may direct local copying and/or moving of data. The management unit may send a request to one node to read data from another node, for example, by a peer to peer data transfer.

The previous copy of the data on the risky node may be deleted.

Optionally, segments are moved from the risky network node to the safe network node (i.e., deleted from the risky network node). Alternatively, the segments are reconstructed using redundancy data, and the reconstructed segment is stored in the safe network node. Reconstruction may be performed when the original stored copy has been (or believed to have been) modified or corrupted.

Alternatively, instead of redistributing segments to a different network node, the segments are redistributed to a different storage unit of the same network node, for example, when the different storage units may be separately managed and/or may be divided to have their own security risk levels. Different storage units of the same network node may have different security risk levels, for example, a removable disk on key with encryption by a single user may have a higher security risk level than a non-encrypted hard drive shared by multiple users.

Alternatively, instead of creation and/or reconstruction of the new copy, the security risk level of the network node and/or storage unit is increased, based on manual configurations provided by the user of the network node and/or system administrator (e.g., via a configuration application programming interface) and/or automatically by the management unit and/or client module.

It is noted that when one or more network nodes have improvements in their security risk levels representing reductions in security risk (i.e., improvement in safety), such nodes may be used to store additional security sensitive objects having low requirement risk limits. For example, a node with a risk level of 0.5 that due to improvement in security (e.g., installation of an updated anti-virus program, or installation behind a firewall) now falls to 0.1, may be used to store data objects with requirements of 0.1 and above, which is a larger group of objects than the objects that could previously be stored (i.e., having requirements of 0.5 and above).

It is noted that redistribution (or initial storage of a new data object) may be performed in light of performance related network node data, for example, out of the set of network nodes suitable for storage based on security risk levels, the designated sub-set of network nodes may be selected according to the performance data. Examples of performance data include: type of processor, number of processors, processor availability, storage availability, processor memory availability, network access performance (e.g., bandwidth, error rate, and available up time), and geographical proximity to the user owning the data object.

Figure 3:
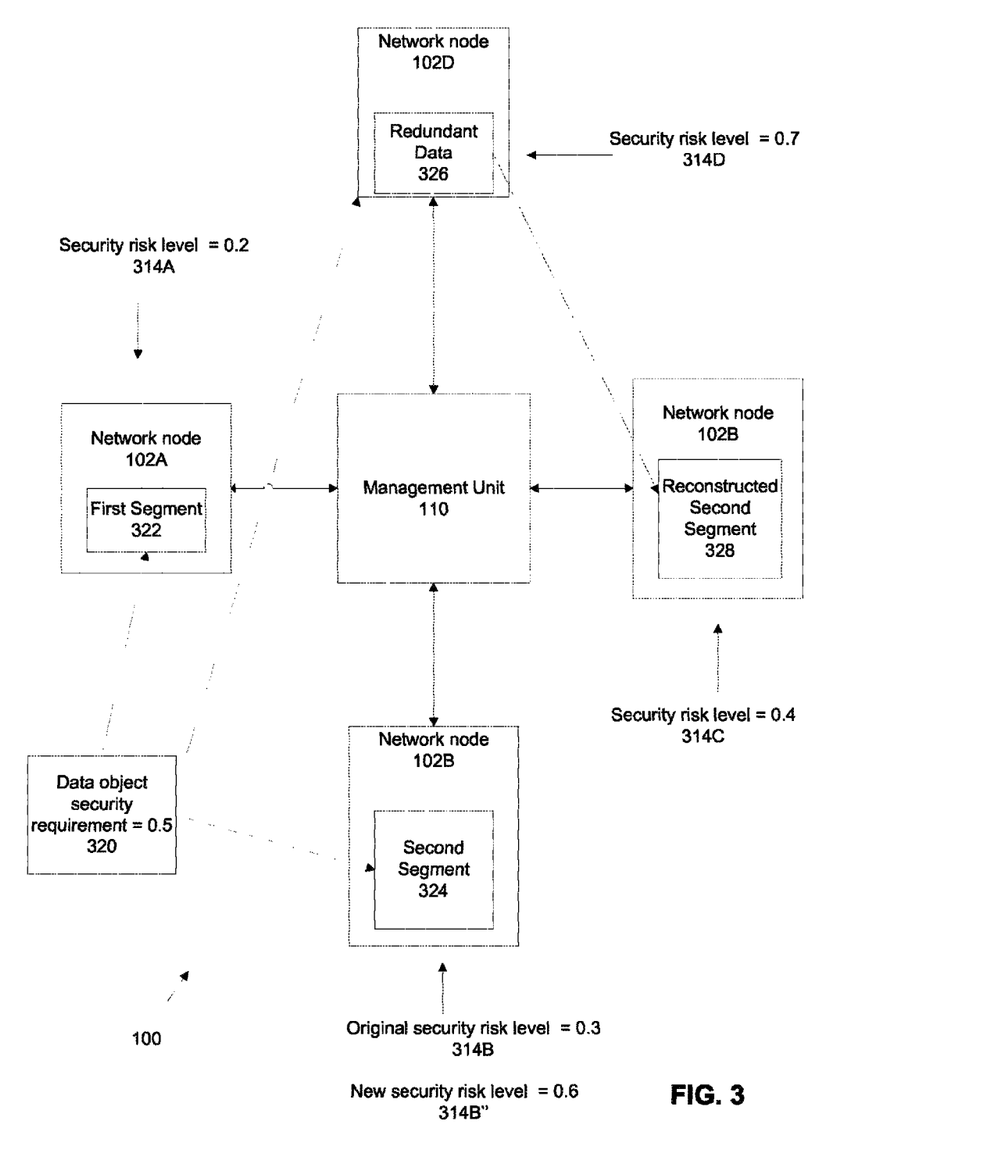
FIG. 3 is a schematic depicting operation of the method of FIG. 2 using the system of FIG. 1, in accordance with some embodiments of the present invention.

Reference is now made to FIG. 3, which is a schematic depicting operation of the method of FIG. 2 using the system of FIG. 1, in accordance with some embodiments of the present invention. In this example, the security risk levels may be probability values based on a security breach scale, with 0 representing no risk, and 1 representing certain risk.

At 202, security risk levels 314A-D are calculated for network nodes 102A-D, as described herein. For example, level 314A of device 102A is 0.2, level 314B of device 102B is 0.3, level 314C of device 102C is 0.4, and level 314D of device 102D is 0.7.

A data object 320 is stored in two segments. The requirement associated with the data object is 0.5. Therefore, the data object may be stored in network nodes having risk levels less than 0.5. For example, a first segment 322 is stored in network node 102A (having security risk level of 0.2), and a second segment 324 is stored in network node 102B (having security risk level of 0.3).

Redundancy data 326 for both first segment 322 and second segment 324 is stored on node 102D. It is noted that the redundancy data 326 may be stored in a node with low security risk level, for example, where the redundancy data is distributed over multiple nodes (e.g., multiple copies) such when a security breach of one node storing the redundant data occurs, the redundant data is recoverable from another node storing additional redundant data.

At 204, the network nodes are monitored in real-time. A change in security risk level 314B is detected, from 0.3 to a new level 314B" of 0.6, representing an increase in security risk, for example, due to a recent security breach, or lack of updating an anti-malware program on time, or removal of a firewall.

At 206, the requirement of second segment 324 is compared to the new security risk level of the network node. Since the new security risk level value 0.6 is now above the requirement of 0.5, the second segment is determined to be in an unacceptable security environment, and is designated for creation of a new copy thereof.

At 210, second segment 328 is reconstructed from redundant data 326 stored on network node 102D. Reconstructed second segment 328 is stored on network node 102C, which has maintained the security risk level of 0.4, which is lower than the requirement of second segment of 0.5.

Figure 4:
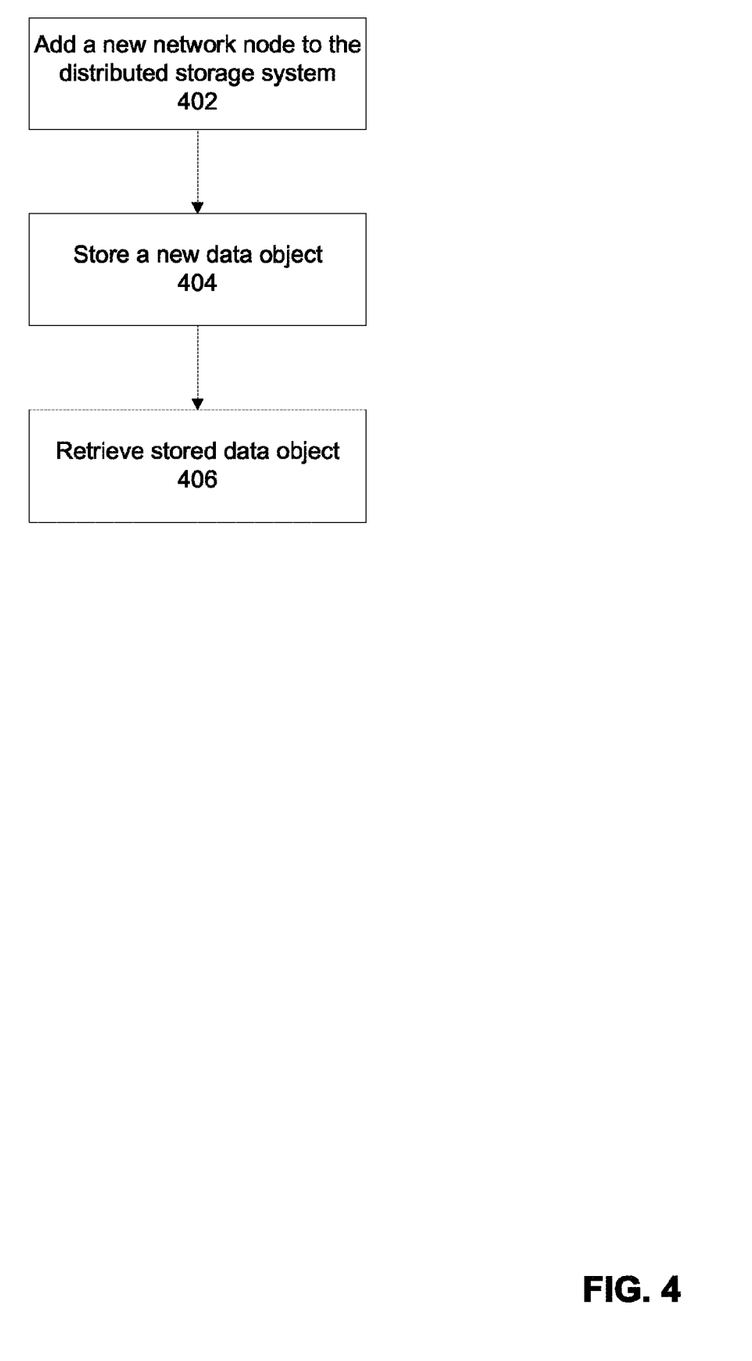
FIG. 4 is a flowchart of optional features performed on the distributed system, such adding new nodes, saving new data objects, and retrieving stored data objects, in accordance with some embodiments of the present invention.

Reference is now made to FIG. 4, which is a flowchart of optional features performed on the distributed system, in accordance with some embodiments of the present invention. The features of FIG. 4 may be performed unrelated to the monitoring described with reference to FIG. 1 (i.e., at different periods of time and/or not triggered by the monitoring), but using the updated real-time security risk levels generated by the monitoring.

Optionally, agent module 108 is installed on each network node, for communication with one or more of the management units and/or with other network nodes. The deployment of agent module 108 may be performed by download agent module 108 from the management unit, another network node, and/or a remote server. The deployment of agent module 108 may be performed by a tool, for example, an installation application. Deployment may be performed manually (e.g., by a system administrator) and/or automatically (e.g., by control software).

Optionally, at 402, a new network node is added to the distributed system by code implementable by processor(s) of node(s) and/or management unit(s). The new network node may be added, for example, as an entry in a database including a list of member nodes, as an entry in a routing table, and/or as an entry in available total storage memory.

The new network node may be added by an affiliated entity, for example, in a bank an information technology (IT) manager may use a deployment tool to distribute agent module 108 to the nodes. For example, in an internet service provider (ISP) that provides a computing cloud, agent module 108 may be distributed as a service to clients of users as a service and/or in exchange for benefits. For example, the case of a computer vendor and/or hard-drive vendor, agent module 108 may be pre-installed on the sold hardware as part of a bundle of services.

Optionally, the joining process is automatic, controlled from the management unit accessing the network node and/or one or more peer nodes (e.g., when peer to peer communication is enabled). Optionally, agent module 108 communicates with the management unit after installation to add the node to the distributed system. Storage associated with the local node may be allocated to the distributed system by agent module 108, for example, according to a system configuration definition.

The security risk level may be calculated for the new network node as described herein.

Optionally, the new network node is added before the security risk level is calculated. In such a case, the new network node may be assigned a default security risk level, which may set higher than a predefined system risk requirement. The high level may be designed to exercise caution when adding new network nodes, which may be malicious network nodes, or network nodes at high risk of security breaches that may risk affecting other parts of the system. The security risk level may be adjusted lower when an updated security risk level is calculated, as described herein. Alternatively, the security risk level is calculated for the new node before the node is available for storage.

Alternatively, the new network node is joined to the distributed system, with additional processing being performed to increase the security risk level of the network node, for example, encryption of data segments stored on the node, a requirement to install anti-malware, and a requirement to add user password protection. The security risk level may be increased to the predefined system requirement, according to a history of requirements of data objects stored on other nodes, and/or according to a tradeoff, for example, the availability of the processor to perform encryption (i.e., the higher the availability the higher the increase in security risk level). The management unit may flag and/or tag network nodes with low security risk levels (e.g., below a threshold). A user (e.g., system administrator) may be automatically provided with messages indicative of ways in which to improve the security risk level of nodes with low security risk levels, for example, through a graphical user interface in association with the management unit. The system administrator may change the security risk level of the node or leave the level as-is.

As increasing the security risk level may be costly (e.g., in terms of additional hardware, software, memory and/or processing requirements, such as to perform encryption), the security risk level may be maintained at a lower level until the higher level is needed. The security risk level may be selectively increased, for example, based on the trade off of increased cost versus additional ability to store objects having high security requirements, for example, the degree of encryption complexity may be selected according to the tradeoff and/or available resources to achieve a target security risk level.

Alternatively, the new network node is added to the distributed system irrespective of the calculated security risk level. Use of the network node for storage of new data objects may be based on the calculated level to join data objects have appropriate security requirements, as described herein.

Optionally, at 404, a new data object is received for storage within the distributed system via a gateway interface, for example, the REST API and/or SDK.

The data object may be associated with a security requirement representing a desired security risk, as described herein. The security risk requirement may be selected by the user, automatically calculated by a software module, and/or based on predefined system default values.

Optionally, the new data object is divided into multiple segments, by code implementable by processor(s) of the management unit and/or by the agent module. Each segment is designated for storage within a different network node according to the calculated security risk level of the device in view of the data object risk requirement. Network nodes having respective security risk levels representing relatively lower security risk relative to the security requirement are designated for storage. Each segment is stored in the respective designated network node.

Optionally, the segments are encrypted. The encryption key may be stored in a protected encryption key repository, for example, in a virtual hardware security module (HSM).

Optionally, redundancy is added to the objects to allow reconstruction of each segment from other segments. The redundancy data may be added to each segment or part thereof, for example, using erasure codes (thereby maintaining the same number of segments, but increasing the size of each segment), and/or redundancy may be added in the form of mirrored segments (increasing the number of segments but maintaining the size of each segment).

Optionally, the segments are initially stored and/or redistributed to storage on different network nodes according to a predefined security profile. The security profile may be used in combination with the security requirement (e.g., in parallel or serially) to designate a suitable set of network nodes for storage. The predefined security profile may include binary criteria for designation of the network node set (i.e., store here or do not store here), for example, designated contacts of a user providing the data object, a designated organization associated with the user, and a network service provider. The security profile may include criteria for selection of user preferred network nodes for storage. The security risk levels of the devices in view of the security requirement of the data object may then be used to select the sub-set of network nodes actually used to store data segments. The predefined security profile may be provided by the user, automatically calculated by a software module, and/or based on system defaults.

Optionally, at 406, a request to retrieve a data object is received, for example, by an application, optionally via the REST API and/or SDK. The request may be received, for example, at the management unit, at a node storing a segment of the data object, and/or at a different node that is not storing a segment of the data object.

The central server (and/or each client module) may maintain a mapping database indicating where the segments of the data object are located.

Since the system regularly performs monitoring and/or redistribution of data as described herein, data integrity and/or security of the segments has been maintained, allowing the objects to be efficiently retrieved (e.g., avoiding discovering corrupted object data during retrieval). The objects are decrypted (as required) and reconstructed from segments to form the data object.

Optionally, the current security risk level of the storage unit is estimated and confirmed before retrieval of the data object. The security risk level may be compared to the security requirement of the data object, to verify that the storage unit meets the minimal requirement. Failure to meet the minimal requirement may be indicative of a security breach.

Optionally, after the minimal security requirement has been confirmed, the decryption key is provided to decrypt the data object.

The methods as described above are used in the fabrication of integrated circuit chips.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and/or methods will be developed and the scope of the term distributed system is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of maintaining a security risk level of data objects stored in a distributed system, comprising:
   estimating a current security risk level of at least one storage unit of each of a plurality of network nodes based on real time monitoring;
   distributing a plurality of data objects among the at least one storage units of the plurality of network nodes according to the current security risk level such that a minimal security requirement of each data object is complied with;
   detecting a change in the current security risk level of the at least one storage unit;
   creating a new copy of at least one of the plurality of data objects stored on the at least one storage unit associated with the change in the current security risk level by reconstructing the new copy from redundancy data stored on at least one other node, for storage on a different network node such that the minimal security requirement of each data object of the plurality of data objects is maintained;
   wherein existing data segments on the at least one storage unit associated with the change in the current security risk level are not used to create the new copy; and
   wherein other segments related to other data objects of the plurality of data objects satisfying the change in the current security risk level are maintained on the at least one storage unit associated with the change in the current security risk level.

2. The method of claim 1, wherein creating a new copy comprises creating the new copy of at least one data segment of the data object, wherein a plurality of data segments stored on different network nodes are used to reconstruct the data object.

3. The method of claim 1, wherein creating a new copy comprises creating the new copy of a set of data segments sufficient to reconstruct the data object, wherein each member of the set is stored on a different network node.

4. The method of claim 1, wherein the detecting is performed in real-time.

5. The method of claim 1, wherein detecting is performed at time periods independent from at least one of: data object storage operations and data object retrieval operations.

6. The method of claim 1, wherein detecting comprises receiving network messages transmitted from each network node to at least one management unit, the network messages including a member of a group consisting of: data for calculating a real-time security score, a calculated new security score, and the change in the security score.

7. The method of claim 1, wherein the security risk level is a security score calculated from at least one of: a current security risk score and a data integrity score.

8. The method of claim 1, wherein the security risk level is a security score calculated from at least one security parameter selected from the group consisting of: a risk of access by an unauthorized entity to stored objects, risk of compromising integrity of the stored objects, risk of compromising allowed access, and risk of infection by malware.

9. The method of claim 8, wherein the security risk level represents a real-time probability of occurrence of an event defined by the at least one security parameter.

10. The method of claim 1, wherein the security risk level is a security score calculated based on instructions issued by a remote unit to the network node to perform a security test locally that attempts to breach security of the respective storage units, and gathers the outcome of the test.

11. The ethod of claim 1, further comprising adding metadata to each data object or part thereof, wherein the change in the security risk level is identified according to calculated changes in an integrity test performed on each data object using the added metadata.

12. The method of claim 11, wherein the metadata includes at least ane member of a group consisting of: random bytes and locations within the data. object, algebraic signatures, checksum values and hash values.

13. The method of claim 1, wherein redistributing data objects comprises reconstructing at least one data object stored on the storage unit using data stored on other storage units, and storing the at least one reconstructed data object on a different storage unit.

14. The method of claim i, wherein the security risk level is a security score calculated from at least one security parameter member selected from the group consisting of: history of detected security vulnerabilities, anti-malware software version installed on the network node, presence of a firewall, and physical location of the network node.

15. The method of claim 1, further comprising:
estimating the security risk level for the new network node; and
adding the new network node to the distributed system when a minimal predefined system risk requirement is maintained by the new network node.

16. The method of claim 15, further comprising processing the network node to increase the security risk level of the network node to the minimal predefined system requirement.

17. The method of claim 1, further comprising:
receiving a new data object for storage within the distributed system, the data object associated with a security requirement representing a desired minimum security risk;
dividing the new data object a plurality of data segments;
designating each data segment for storage within a different storage unit such that the desired minimal security requirement of each data segment is maintained.

18. The method of claim 1, further comprising:
identifying a storage unit having the change in the current security above a predefined system risk requirement; and
redistributing all data objects stored on the identified storage unit, to storage on different storage units such that the minimal security requirement of each data object is maintained relative to the predefined system risk requirement.

19. The method of claim 18, further comprising:
removing the identified storage unit from the distributed system.

20. The method of claim 1, further comprising: encrypting the data object to meet the minimum security requirement and maintaining other data objects in a non-encrypted state according to the minimum security requirement.

21. The method of claim 1, further comprising: providing a decryption key for decryption of encrypted data objects after confirmation of the minimum security requirement.

22. The method of claim 1, further comprising increasing the security risk level of the storage unit by encrypting data objects stored thereon.

23. The method of claim 1, wherein data objects are at least one of: initially stored and redistributed to storage on different network nodes according to a predefined security profile.

24. The method of claim 23, wherein the predefined security profile includes at least one member selected from the group consisting of: designated contacts of a user providing the data object, a designated organization associated with the user, and a network service provider.

25. The method of claim 1, further comprising:
analyzing changes in the security risk level to predict a future security risk level, and performing the creating the new copy before the minimal security risk level is reached.

26. The method of claim 1, further comprising:
analyzing changes in the security risk level indicative of a risk event in the storage unit, quarantining the storage unit, reconstructing data objects stored on the storage unit from redundant data stored on other storage units, and redistributing the reconstructed data objects.

27. A system of storing data objects in distributed storage while maintaining a security requirement, comprising:
a plurality of network nodes, each including at least one processor and at least one storage unit;
wherein each storage unit is associated with a current security risk level estimated based on real time monitoring;
wherein a plurality of data objects are distributed among the at least one storage units of the plurality of network nodes according to the current security risk level such that a minimal security requirement of each data object is complied with; and
at least one management unit in communication with the plurality of network nodes, the at least one management unit including a code implementable by a processor of the at least one management unit to:
detect a change in the current security of at least one of the plurality of network nodes and create a new' copy of at least one of the plurality of data objects stored on the at least one storage unit associated with the change in the current security risk level by reconstructing the new copy from redundancy data stored on at least one other node, for storage on a different network node such that the minimal security requirement of each data object of the plurality of data objects is maintained;
wherein existing data segments on the at least one storage unit associated with the change in the current security risk level are not used to create the new copy; and
wherein other segments related to other data objects of the plurality of data objects satisfying the change in the current security risk level are maintained on the at least one storage unit associated with the change in the current security risk level.

28. The system of claim 27, wherein the data objects are members selected from the group consisting of: images, documents, databases, videos, operating system files, and medical records.

29. The system of claim 27, wherein the data objects include code designed for distributed processing by local execution by the at least one processor of the respective node.

30. The system of claim 27, further comprising an agent module for local installation at each network node, the agent module including a code implementable by a processor of the agent module to locally gather data to estimate the security risk level of the respective at least one storage unit, and transmit the gathered data to the management unit.

31. The system of claim 27, further comprising a client module in communication with the management unit, the client module including a code implementable by a processor of the client module to store a data object within the distributed system and retrieve the stored data object from the distributed system.

32. The system of claim 31, wherein the client module is an application programming interface (API) that provides a high abstraction level of storing and accessing data objects locally at respective network nodes or client computers.

33. A computer program product for maintaining a security requirement of data objects stored in a distributed system comprising a readable storage medium storing program code thereon for use by a management unit, the program code comprising:

instructions for estimating a current security risk level of at least one storage unit of each of a plurality of network nodes based on real time monitoring;

instructions for distributing a plurality of data objects among the at least one storage units of the plurality of network nodes according to the current security risk level such that a minimal security requirement of each data object is complied with;

instructions for detecting a change in the current security risk level of the at least one storage unit;

instructions for creating a new copy of at least one of the plurality of data objects stored on the at least one storage unit associated with the change in the current security risk level by reconstructing the new copy from redundancy data stored on at least one other node, for storage on a different network node such that the minimal security requirement of each data object of the plurality of data objects is maintained;

wherein existing data segments on the at least one storage unit associated with the change in the current security risk level are not used to create the new copy; and wherein other segments related to other data objects of the plurality of data objects satisfying the change in the current security risk level are maintained on the at least one storage unit associated with the change in the current security risk level.

\* \* \* \* \*